United States Patent [19]

Fisher

[11] Patent Number: 4,925,351
[45] Date of Patent: May 15, 1990

[54] PUSH-IN FASTENER CLIP

[75] Inventor: Charles K. Fisher, Belford, N.J.

[73] Assignee: TRW, Inc., Cleveland, Ohio

[21] Appl. No.: 326,312

[22] Filed: Mar. 21, 1989

[51] Int. Cl.$^5$ .............................................. F16B 37/04
[52] U.S. Cl. ...................................... 411/182; 411/74; 411/913
[58] Field of Search ...................... 411/15, 60, 61, 172, 411/173, 175, 182, 913, 74

[56] References Cited

U.S. PATENT DOCUMENTS

| | | |
|---|---|---|
| 1,817,584 | 8/1931 | Rosenberg . |
| 2,267,379 | 12/1941 | Tinnerman . |
| 2,369,962 | 2/1945 | Gisondi . |
| 2,567,884 | 9/1951 | Heath . |
| 2,707,013 | 4/1955 | Flora et al. . |
| 3,375,749 | 4/1968 | Coldren et al. . |
| 3,645,311 | 2/1972 | Tinnerman ........................ 411/173 |
| 4,300,865 | 11/1981 | Murray . |
| 4,595,325 | 6/1986 | Moran et al. . |
| 4,610,588 | 9/1986 | Van Buren et al. . |

FOREIGN PATENT DOCUMENTS

| | | | |
|---|---|---|---|
| 1372146 | 4/1964 | France | .................................. 411/74 |
| 1514108 | 1/1968 | France . | |
| 534564 | 3/1941 | United Kingdom . | |

Primary Examiner—Neill R. Wilson
Attorney, Agent, or Firm—Fay, Sharpe, Beall, Fagan, Minnich & McKee

[57] ABSTRACT

A fastener clip for positioning in a preformed aperture in a workpiece to receive a threaded fastener comprises a planar head having opposed faces with a threaded opening extending between the faces and a pair of resilient legs joined to opposite ends of the faces. The legs each have a body extending away from the head angularly and terminating in a free end located to engage the shank of the threaded fastener extended through the opening. A pair of resilient tab members are integral with each leg and extend outward of the respective leg in a direction away from the free end to a terminal end bent inwardly of the respective leg toward the head. At least a portion of each tab member extends to a point outwardly of the maximum radial extent of the associated leg at a location adjacent the head with the terminal end having a radial position closer to the opening than the first end of the legs.

3 Claims, 2 Drawing Sheets

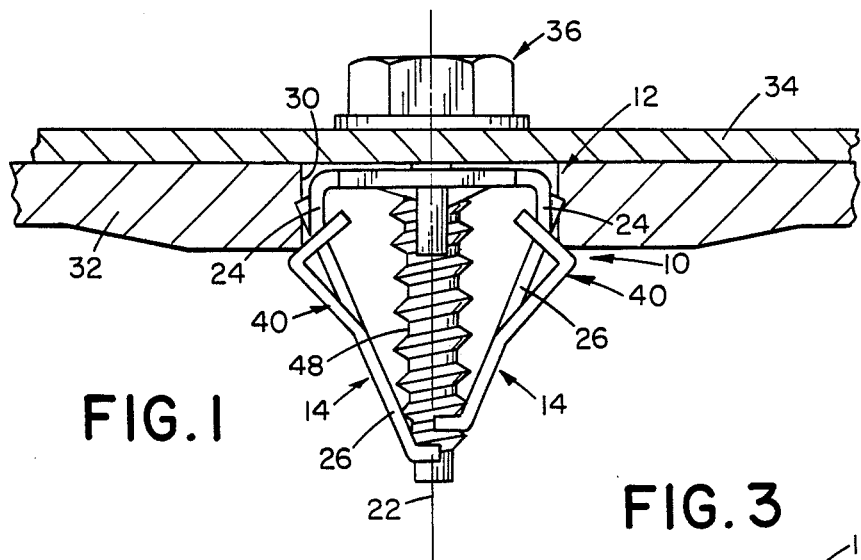
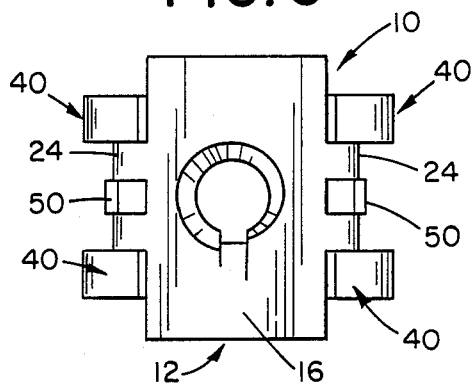
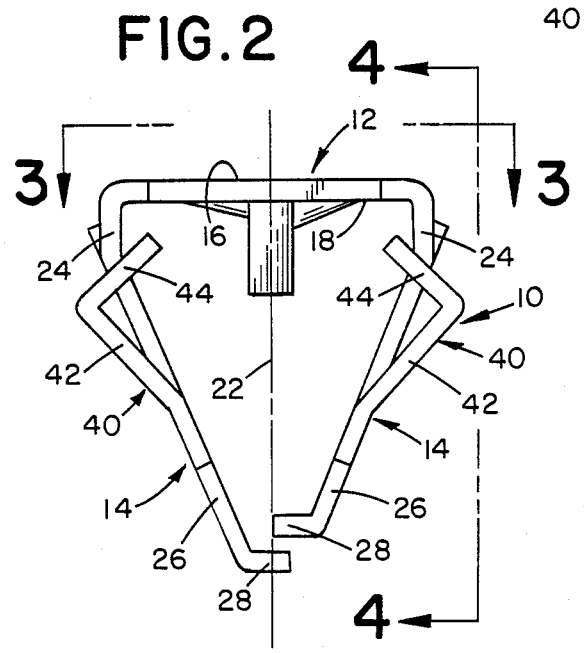
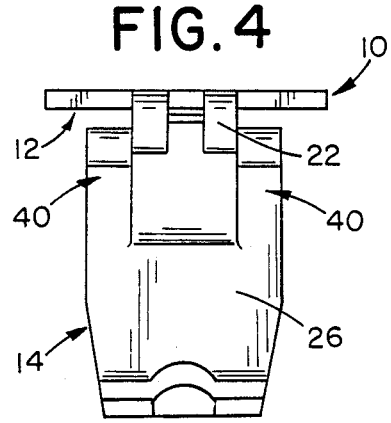

PUSH-IN FASTENER CLIP

BACKGROUND OF THE INVENTION

The subject invention is directed toward the fastener art and, more particularly, to a push-in fastener clip of the type used to provide a rigid, threaded opening in sheet material panels or the like.

In the commonly assigned prior U.S. Pat. 4,610,588, issued Sept. 9, 1986, for "Fastener Clip", there is disclosed a fastener clip which can be robotically installed to provide threaded openings in preformed workpieces. The prior fastener clip design uses a pair of resilient legs which extend from a head portion having a threaded opening for receipt of a threaded fastener such as a screw. The legs function to retain the fastener in the workpiece aperture. To this end, each leg includes first and second portions with the second portion bent back upon the first portion in a position spaced outwardly thereof. A free end of the second portion extends inwardly through an aperture in the first portion.

During use the fastener is retained in position by the bent back portion of the legs engaging under the inner surface of the workpiece about the periphery of the opening in which the fastener is mounted. When the fastener is placed under a tension load, inward collapse of the legs in a radial direction is prevented by engagement of the free ends of the second portion of the legs with the shank of the threaded fastener extending through the threaded opening in the head portion.

This prior fastener clip has been successful and functions well in many environments. It can be made for use in both metal and plastic workpieces. The multiple bends in the legs do, however, make it difficult to manufacture the fastener to the tolerances desired. Additionally, unless the workpiece thickness is held to close tolerances, there have been some problems with the fastener rattling in the workpiece opening when it is not under tension.

SUMMARY OF THE INVENTION

The subject invention provides a simplified fastener design which overcomes the noted problems. Fasteners formed in accordance with the invention are easier to fabricate and are not subject to rattling with workpiece thickness variations.

In particular and in accordance with the subject invention, there is provided a fastener clip intended for positioning in a preformed aperture in a workpiece to provide a threaded opening for receiving an elongated threaded fastener. The clip generally comprises a planar head portion having opposed faces and a threaded opening extending between the opposed faces. A pair of legs are joined to the head portion on opposite sides of the opening and extend generally away from the head portion. The legs terminate in free end portions which are located to engage on opposite sides of an associated threaded fastener received in the opening. Resilient tabs join to each of the legs at a location between their respective free end portions and the head portions. The tabs have a first portion extending outwardly of the legs in a direction away from the free end portions and an integral end portion bent to extend radially inwardly of the legs toward the opening. Carried by each leg at a location between the respective tab portions and the head portion are short resilient fingers adapted to engage with the peripheral wall of the workpiece aperture to limit the movement of the fastener clip in the aperture.

Preferably, and in accordance with a more limited aspect of the invention, each leg carries two of the tabs which are laterally spaced and mounted in opposed relationship to the respective tabs on the other leg. Preferably, all of the tabs join to the legs at substantially the same distance from the head portion.

In accordance with a still further aspect of the invention, the tabs preferably extend outwardly of their respective leg a greater radial distance from the axis of the opening than any portion of their respective leg. The arrangement of the tabs is such that when the fastener clip is inserted in the preformed opening in the workpiece, the tabs lock or engage with the inner face of the workpiece, beneath the periphery of the workpiece aperture. The nature of the tabs is such that during insertion they collapse radially inward but after passing through the workpiece aperture they resiliently spring outwardly into an engaged position. Their relationship to the legs is such that axial withdrawal generates forces in the tabs which due to their relationship with the legs causes the legs to be loaded in tension rather than bending. The simple shape of the tabs facilitates manufacture and allows holding of extremely close tolerances. The balanced shape relationship between the tabs and the resilient aperture engaging fingers assures a balanced positioning of the fastener clip in the workpiece aperture.

Accordingly, a primary object of the invention is the provision of a fastener clip which has a simplified design to facilitate both manufacture and use.

Yet another object is the provision of a fastener clip of the general type described wherein the leg portions are loaded generally in tension when axial withdrawal forces are applied to the installed fastener.

A further object is the provision of a fastener clip of the type under consideration wherein means are provided to lock the clip in position and holding it against rattling or undesired movement in the workpiece opening when the clip is not under a tension load.

A still further object of the invention is the provision of a fastener clip which is particularly suited for robotic installation and which simplifies the problems encountering in manufacturing such clips.

BRIEF DESCRIPTION OF THE DRAWINGS

The above and other objects and advantages will become apparent from the following description when read in conjunction with accompanying drawings wherein:

FIG. 1 is side elevational view (partially in section) showing a preferred embodiment of a fastener formed in accordance with the invention installed in a workpiece;

FIG. 2 is a side elevational view of the fastener clip of FIG. 1;

FIG. 3 a plan view of the fastener clip of FIG. 2 taken on line 3—3 of FIG. 2;

FIG. 4 a side elevational view taken on line 4—4 of FIG. 2; and

Referring more particularly to the drawings wherein the showings are for the purpose of illustrating a preferred embodiment of the invention only, and not for the purpose of limiting same, FIGS. 1 through 3 illustrate the fastener clip 10 as including a head portion 12 and pair of opposed resilient legs 14. The clip 10 is preferably stamped and bent from a single piece of spring steel to have the configuration shown with the head and legs integrally joined. As particularly shown in FIGS. 2 and 3, the head portion 12 comprises a pair of opposed side faces 16 and 18. A threaded opening 20 is formed centrally through the head portion 12 such that its axis 22 (see FIG. 2) extends generally perpendicular to the faces 16 and 18.

Figure 5:
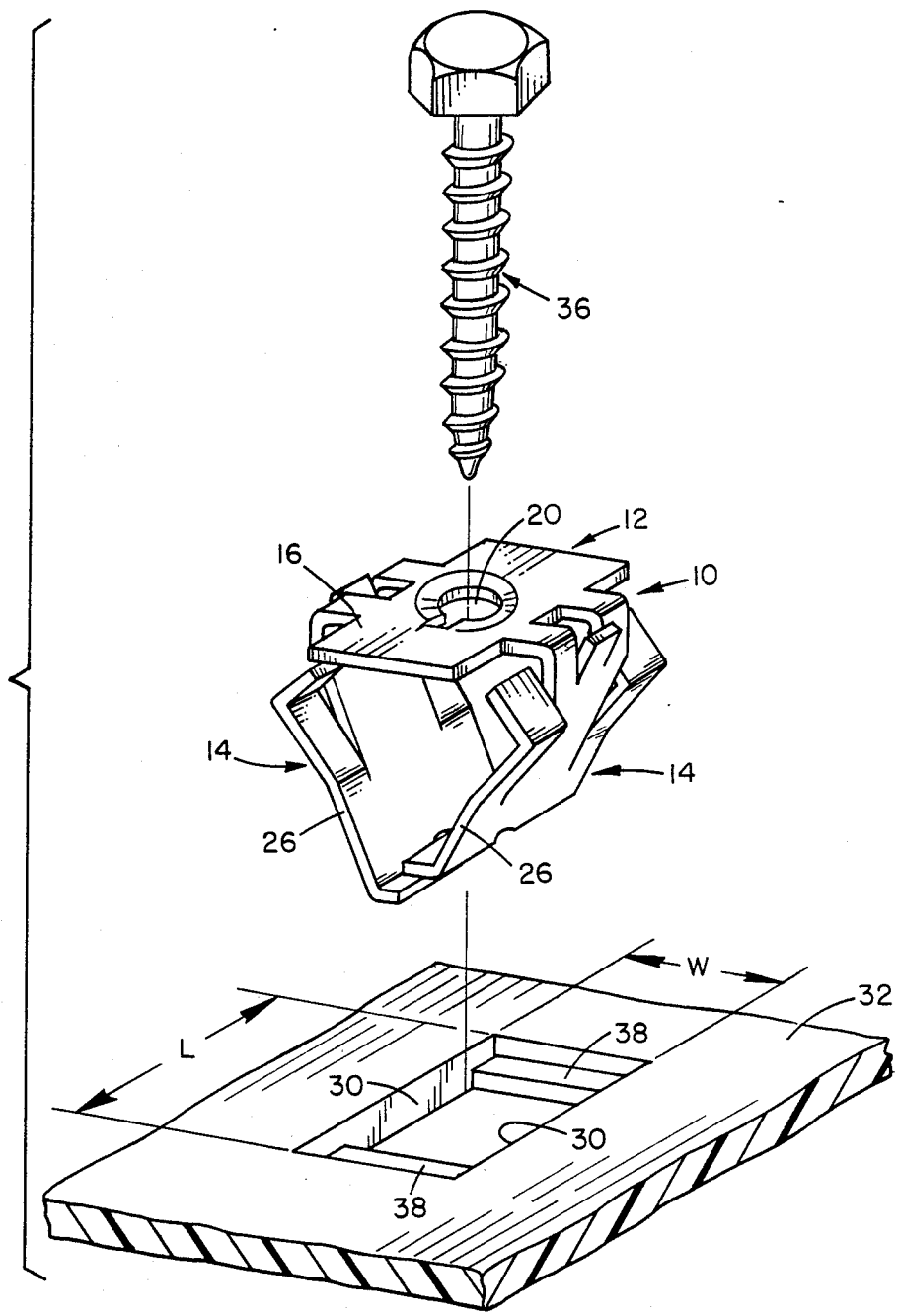
FIG. 5 exploded pictorial view showing the fastener clip of FIG. 1 together with a workpiece and an associated screw.

In the embodiment under consideration, the threaded opening 20 is a single, stamped thread form as is commonly used on metal fastener clips of this type; however, it should be appreciated that multiple thread apertures could be provided if desired. Referring to FIG. 3, it will be noted that the head portion 12 preferably has a generally rectangular configuration with the leg members 14 integrally joined to the head portion on laterally opposite sides in generally opposed and aligned relationship. As particularly shown in FIGS. 1 and 2, each of the leg members 14 includes a first portion 24 which extends generally perpendicularly away from the head portion 12. A second generally straight section 26 joins integrally with the first portion 24 and extends diagonally inwardly generally toward the axis 22. A free end portion 28 on each of the legs 14 is bent to extend directly inward toward the axis 22. As will subsequently be explained and as shown in FIG. 5, each of the free end portions 28 are provided with an inwardly extending recess 29 to permit them to engage on opposite sides of the threaded fastener which extends through the opening 20 of head portion 12.

FIG. 1 illustrates the fastener 10 mounted in position in an opening 30 formed in a workpiece 32. The fastener 10 is illustrated as functioning to join a panel 34 to the workpiece of 32 by use of a threaded screw or elongated fastener 36.

As best shown in FIG. 5, the workpiece 32 is preferably provided with a preformed rectangular opening 30 which has a width W only slightly wider than the maximum lateral extent of the legs 14 as measured over the first portions 24. In the embodiment illustrated, the length L of the opening 30 is slightly wider than the maximum width of the legs 14 and slightly shorter than the overall length of the head 12. Additionally, it would be noted that the opening includes recessed end portions 38 adapted to receive the outermost end portions of the length dimension of the head 12. This allows the head to set flush with the top surface of the workpiece 32 as best seen in FIG. 1.

Referring to FIGS. 1 through 3, it will be seen that the fastener clip 10 further includes a pair of tab members 40 formed integrally with each of the resilient legs 14. As illustrated, each of the tabs 40 is joined to the respective leg 14 at a location between the free end portion 28 and the head portion 16. A first portion 42 of each tab 40 is bent outwardly in a direction radially outward of the leg portion 26. An integral end portion 44 joins with the portion 42 and is bent to extend inwardly of the respective leg toward the opening 20. The maximum outer radial extent of each of the tabs 40 is greater than the maximum width W of the opening 30.

FIG. 1 illustrates the fastener in its installed position with the tabs 40 engaged with the undersurface of the workpiece 32. The tabs can, of course, be inserted directly into the opening 30 from the upper surface. During insertion, accomplished manually or by robot, the tabs 40 are deflected inwardly to allow free passage of the clip into the final located position. When the outer longitudinal ends of the top portion 16 engage in the workpiece recesses 38, the tabs 40 assume the position illustrated in FIG. 1. Thereafter, when a threaded fastener such as screw 36 is positioned in the threaded opening 20 and the threaded shank 48 has entered to the position illustrated in FIG. 1 with its inner free end in engagement and between the inner free ends 28 of the legs 14, the legs 14 are, in effect, in a position wherein an attempted withdrawal of the fastener in an axial direction causes the legs to be placed in a tension load. That is, the forces acting on the legs are not applied in a manner to cause the legs to bend but rather act along the length of the legs. This is also true of the forces applied to the tabs 40.

As can be appreciated, the fastener must be designed for a certain workpiece thickness. That is, the fastener must be designed so that the spacing between the underside of the head portions 12 in the upper surfaces of the tab free ends 44 are a predetermined distance apart chosen on the basis of the workpiece thickness. Although the individual fasteners could work with a variety of workpiece thicknesses, if it was not desired to maintain the upper surface of the fastener flush with the top surface of the workpiece there would normally be a tendency for the fastener to rattle or be loose in the workpiece opening if the workpiece were too thin and the fastener was not under tension. In order to avoid this condition the subject invention provides a pair of fingers 50 which are bent outwardly from the section 24 of the legs 14. Each of the fingers 50 is preferably located midway between the associated pair of tabs 40 and extend outwardly a distance slightly greater than the width of the opening 30. Thus, when the fastener is in the installed position of FIG. 1 the individual fingers 50 engage with the lateral side walls of the opening 30 to hold the fastener in a fixed relationship thereto.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

What is claimed is:

1. A fastener clip for installation in an aperture in a first workpiece to provide a threaded opening for receiving the shank of an associated elongated threaded fastener; said fastener clip comprising a head portion having a threaded opening to receive the shank of the threaded fastener and a peripheral shape such as to prevent its passage through the aperture in the first workpiece;

a pair of spaced resilient legs extending outwardly from one face of said head portion on opposite sides of said threaded opening and terminating in free end portions adapted to engage the threaded fastener when said threaded fastener is installed in said opening;

each said leg carrying a pair of resilient elongated tabs which are joined to the respective leg at a location between said head and said free end portions, each tab comprising a first section bent outwardly and extending in a direction away from the free end of the leg portion on which it is carried and a terminal end section which is bent inwardly and extends generally toward said head portion; and each leg further including a short finger bent radially outwardly at a location laterally intermediate the associated pair of tabs and axially between said head portion and said tabs, each said finger extending radially outwardly a distance greater than the width of the workpiece aperture for engaging the walls of the workpiece aperture irrespective of the presence or absence of said threaded fastener in said opening.

2. The fastener clip as defined in claim 1 wherein said pairs of legs are in aligned relationship on opposite sides of the central axis of said opening.

3. The fastener clip as defined in claim 1 wherein said legs are generally straight and join to said head portion at opposite ends thereof.

* * * * *